United States Patent Office 3,034,976
Patented May 15, 1962

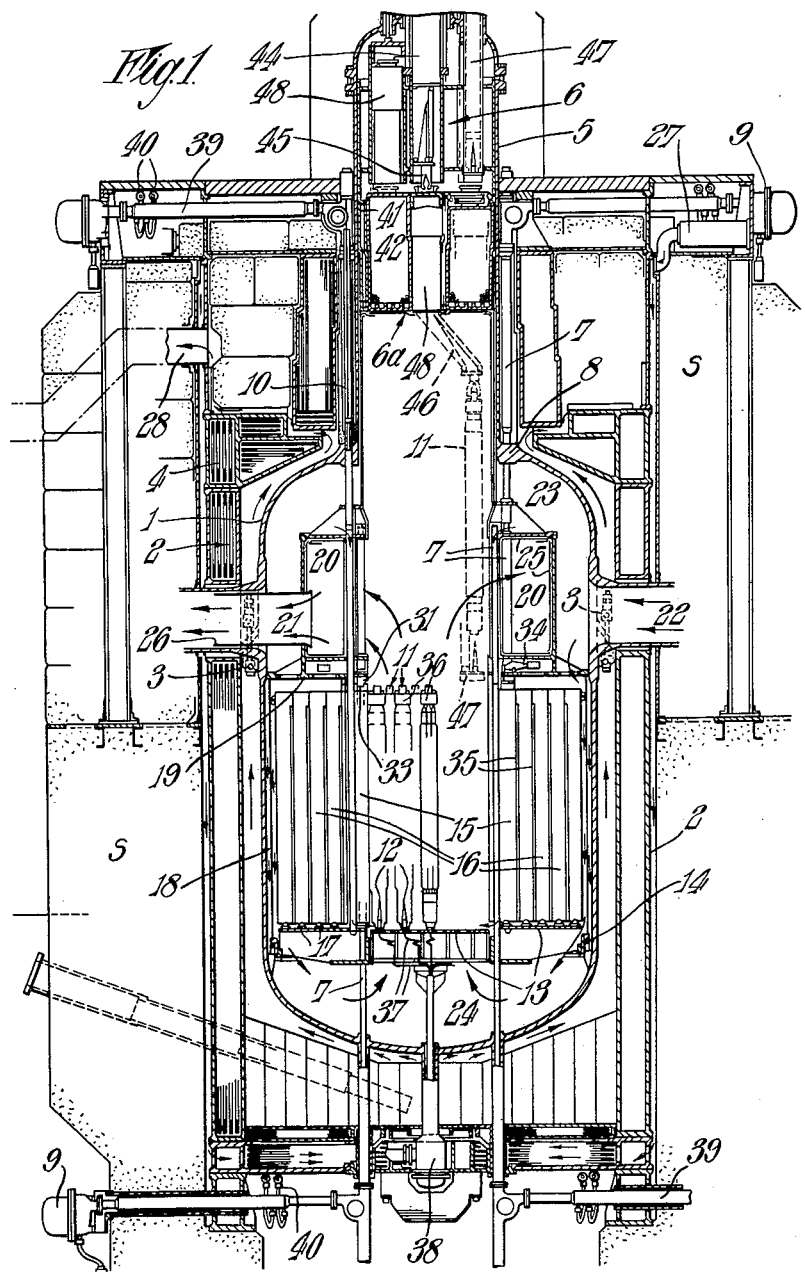

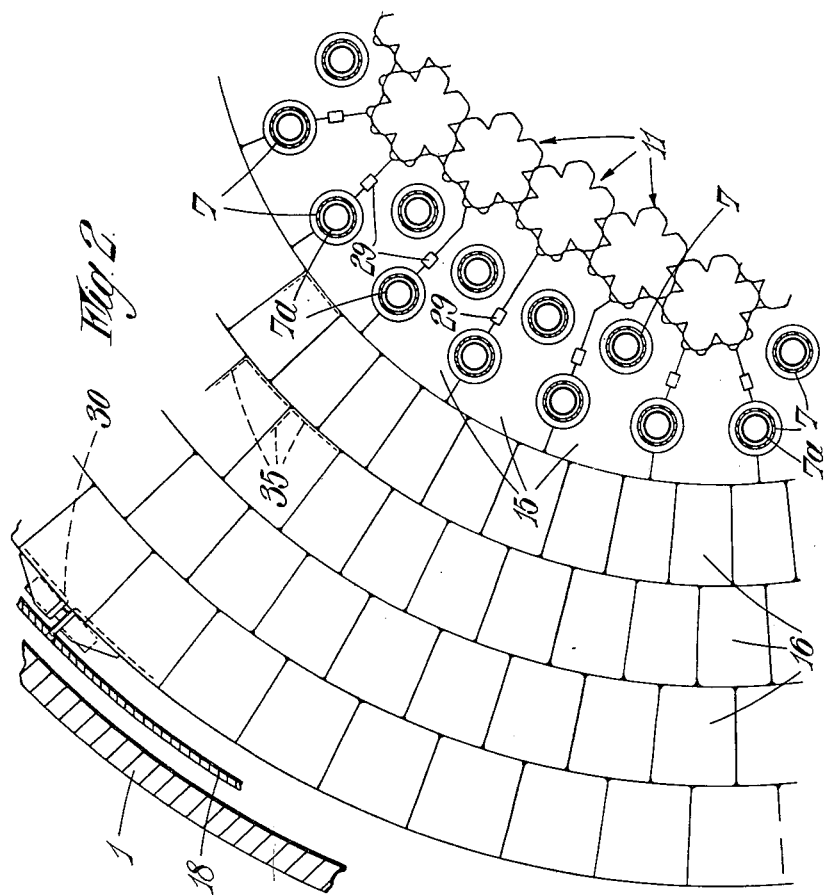

3,034,976
GAS COOLED POWER REACTORS
Peter Fortescue, San Diego, Calif., and George Edward Lockett, Abingdon, England, assignors to The United Kingdom Atomic Energy Authority, London, England
Filed Dec. 16, 1957, Ser. No. 703,050
1 Claim. (Cl. 204—193.2)

This invention relates to gas cooled nuclear power reactors and is particularly concerned with the solid homogeneous type in which the moderator and fuel are combined.

In such a reactor very high heat release rates are possible and the heat can be made available at a high temperature.

An object of the present invention is to provide a core and reflector assembly particularly adapted for operation at a high temperature.

To this end, according to the invention, the core and reflector assembly of a reactor of the type set forth comprises a plurality of elongated core members pivotally supported at their lower ends within a pressure shell and adapted to be held firmly together at their upper ends by a radial pressure differential of the coolant in its passage through the reflector and core.

The coolant path may be determined by gas seals between the core and reflector, said seals being maintained by said pressure differential and the coolant may be routed through the pressure vessel such that the stressed parts are maintained at a temperature close to that of the incoming gas.

The nature of the invention and the various features thereof will be more readily understood if reference is made to the accompanying drawings illustrating, by way of example, one practical form of nuclear reactor embodying the invention.

In the drawings:
FIG. 1 is a central vertical cross section.
FIG. 2 is a fragmentary cross sectional plan of the line II—II of FIG. 2 to a larger scale.

The reactor consists of a cylindrical steel pressure shell 1 suspended within a hollow walled steel frame structure 2 on eight equally spaced adjustable hangers 3. The structure 2 contains spaced steel plates 4 and the voids are filled with water. The structure constitutes both a support and a thermal shield for the pressure vessel 1. An upper extension 5 of the pressure vessel houses a core element charge and discharge mechanism 6 and a rotatable partial shield plug 6a for said mechanism. A concrete biological shield S surrounds the structure 2.

A series of closed-ended zirconium tubes 7 extend downwardly through a shoulder 8 on the pressure vessel and another such series extends upwardly on a slightly smaller diameter through the bottom of the vessel. The tubes 7 contain hollow cylindrical absorber elements 7a (FIG. 2) which are operated by winding mechanisms 9 through cables 10.

The reactor core comprises sixty-one core members each in the form of a cluster 11 mounted on a spike 12 projecting from a perforated platform structure 13 resting on brackets 14 within the shell 1. Around the core are a ring of wedge-section graphite reflector blocks 15 adapted, as will hereinafter be described, to form a gas barrier and formed with vertical channels to accommodate the tubes 7.

Outside the barrier blocks 15 are further wedge-section graphite reflector blocks 16. The blocks 15 and 16 are supported at their lower ends on rounded pins 17 on which they are free to pivot.

An inner shell 18 is also supported from the platform structure 13 and this shell carries a perforated frame 19 on which is mounted a header chamber 20 which communicates with a gas outlet duct 21. A gas inlet duct 22 communicates with the inside of the pressure vessel outside the header chamber 20.

Heat is removed from the core elements by a coolant gas which, as shown by the thick arrows, enters the pressure vessel through the inlet duct 22 into an upper header space 23 and is then obliged to pass downwardly between the reflector blocks 16 and the shell 1, on both sides of the inner shell 18, to a lower header space 24 from which it passes upwardly through spaces within and between the core elements into the header chamber 20 and out of the pressure shell through outlet duct 21.

The path of the coolant gas is such that the stressed parts, namely, the pressure vessel 1, platform 13, inner shell 18, perforated frame 19 and header chamber 20 are all in contact with the relatively cool incoming gas and are thus maintained at a reasonably low temperature. The header chamber 20 which collects the hot gas rising from the fuel elements 11 is lined with heat resisting steel sheet 25 providing an insulating double skin construction which is continued into the outlet duct 21 by a liner 26. Small holes (not shown) are provided in the structural walls of the chamber 20 to allow a small quantity of the cool gas from the inlet 22 to by-pass the reactor core and sweep the interspace between the liner 25 and the said structural walls.

The structure 2 and the outside of the pressure shell 1 are cooled by a flow of air, indicated by the thin arrows, which enters a plurality of inlets 27 and after passing downwardly between the biological shield S and the structure 2 then ascends between the said structure and the pressure vessel 1, finally making its exit through a duct 28.

Referring now particularly to FIG. 2, the graphite barrier blocks 15, through which pass the tubes 7 containing the absorber elements 7a, are seen to be provided with graphite keys 29 which in response to an inward radial gas pressure tend to effect a gas seal at the joints between said blocks. A further seal is made between the top faces of the barrier blocks 15 and the inner periphery of the perforated frame 19. This seal comprises upper and lower graphite rings 31 and 32 (FIG. 1) each consisting of a plurality of overlapping segments and provided with a co-operating annular key and groove formation 33. The upper ring 31 is held against the underside of the frame 19 by a lever and counterbalance mechanism 34 and the lower ring 32 is held down upon the top of the barrier blocks 15 by a similar gravity system not shown.

Thus the path of the gas, as described above and as dictated by the gas seal provided by the keys 29 and 33 is such as to create the radial pressure differential which, when the reactor is operating, holds the core elements and the reflector blocks firmly together. As shown particularly in FIG. 2, a spring girdle 30 is provided around the upper edge of the reflector blocks to keep them in position when the reactor is not operating.

The arrangement is such as to tolerate a considerable amount of distortion and growth of the core elements and reflector blocks both of which are designed to make contact only at their upper ends and are pivoted at their lower ends. The reflector blocks are recessed as indicated at 35 to prevent contact other than at their upper ends and the core element clusters 11 are spaced by spider-like top-end members 36 as is more fully described and illustrated in the specification of our co-pending patent application No. 103,095, filed December 16, 1957.

A system for venting the interior of the core elements comprising a pipe 37 connected to each of the spikes 12 and brought out through the pressure shell 1 to a manifold 38 is also more fully described in said specification.

The tubes 7 containing the absorber elements 7a (FIG.

2) are cooled externally where they pass through barrier blocks 15 and the header chamber 20 (where they are jacketed) by part of the main coolant flow. A substantial clearance is allowed between the tubes 7 and the blocks 15 to permit a flow of coolant sufficient to remove leakage heat from the core before it can raise the temperature of the reflector. The tubes are also cooled internally by a separate coolant circulated through a concentric feed tube by fans housed in the sealed casings of the winding mechanisms 9 and itself cooled by heat exchangers 39 having primary circuit connections 40. The coolant within the tubes 7 is preferably a different gas from that of the reactor coolant so as to facilitate leak detection.

The charge-discharge mechanism 6 is protected during reactor operation by the composite rotating plug assembly 6a suspended by a bearing track 41 in the neck of the pressure vessel 1. Carried within the main rotating plug is an eccentric plug 42 geared to rotate epicyclically when the main assembly is turned. The assembly is penetrated by acecss holes containing simple stepped bungs 48.

When it is required to use the machine for loading, rotation of the plug assembly 6a brings each access hole under a withdrawing lift 43 so that the corresponding bung may be removed and parked. Rotation back to the original position leaves the assembly with a number of open holes ready for the members of the charge-discharge mechanism 6 to pass through.

The charging mechanism consists of the following three main members; the first is a central transfer column 44 which lowers into the reactor charging space with a grapple attachment 45 on a transfer arm 46 as its lower end; the second and third members are "charge" and "discharge hoists" respectively. The charge hoist 47 lowers a new fuel element out of an entry lock into the charging space where it can be removed by the transfer arm 46 and placed into any required core position. The discharge hoist (not shown) is identical to the charge hoist but operates in reverse to lift a spent fuel element out of the charging space after it has been fed by the transfer arm. When each hoist is fully raised the lower end seals into the bottom of its appropriate gas lock to isolate the reactor pressure from entry or exit processes.

The main coolant gas is preferably helium and the external circuit may include a self operating gas turbine compressor unit as described in our co-pending patent application No. 626,041, filed December 3, 1956, now abandoned.

We claim:

A gas cooled nuclear reactor comprising, a pressure shell, a plurality of elongated vertically disposed core members comprising the reactor core pivotally supported at their lower ends and having the upper ends thereof radially movable within the pressure shell, a plurality of elongated vertically disposed reflector members arranged in concentric rings around the core, each reflector member being pivotally supported at the lower end thereof and radially movable at the upper end thereof, seals between the reflector members forming the inner ring whereby a hollow cylindrical gas barrier surrounds the core, a header chamber mounted on the movable top of said gas barrier, a gas seal between said header and said gas barrier, an outlet duct for coolant gas connected to said header chamber, an inlet duct for a coolant gas in the upper part of said shell outside said gas barrier and a passageway between the outer ring of said reflector members and said shell whereby coolant gas passes through said inlet and passageway around said core members and through said header to the outlet duct, the coolant gas maintaining a pressure differential on said gas barrier.

References Cited in the file of this patent

UNITED STATES PATENTS

| | | |
|---|---|---|
| 2,780,596 | Anderson | Feb. 5, 1957 |
| 2,838,451 | Long et al. | June 10, 1958 |
| 2,894,893 | Carney | July 14, 1959 |

OTHER REFERENCES

Hinton: "International Conference on the Peaceful Uses of Atomic Energy," vol. 3, pp. 321–323, August 1955, United Nations Publication, N.Y.